Patented July 18, 1933

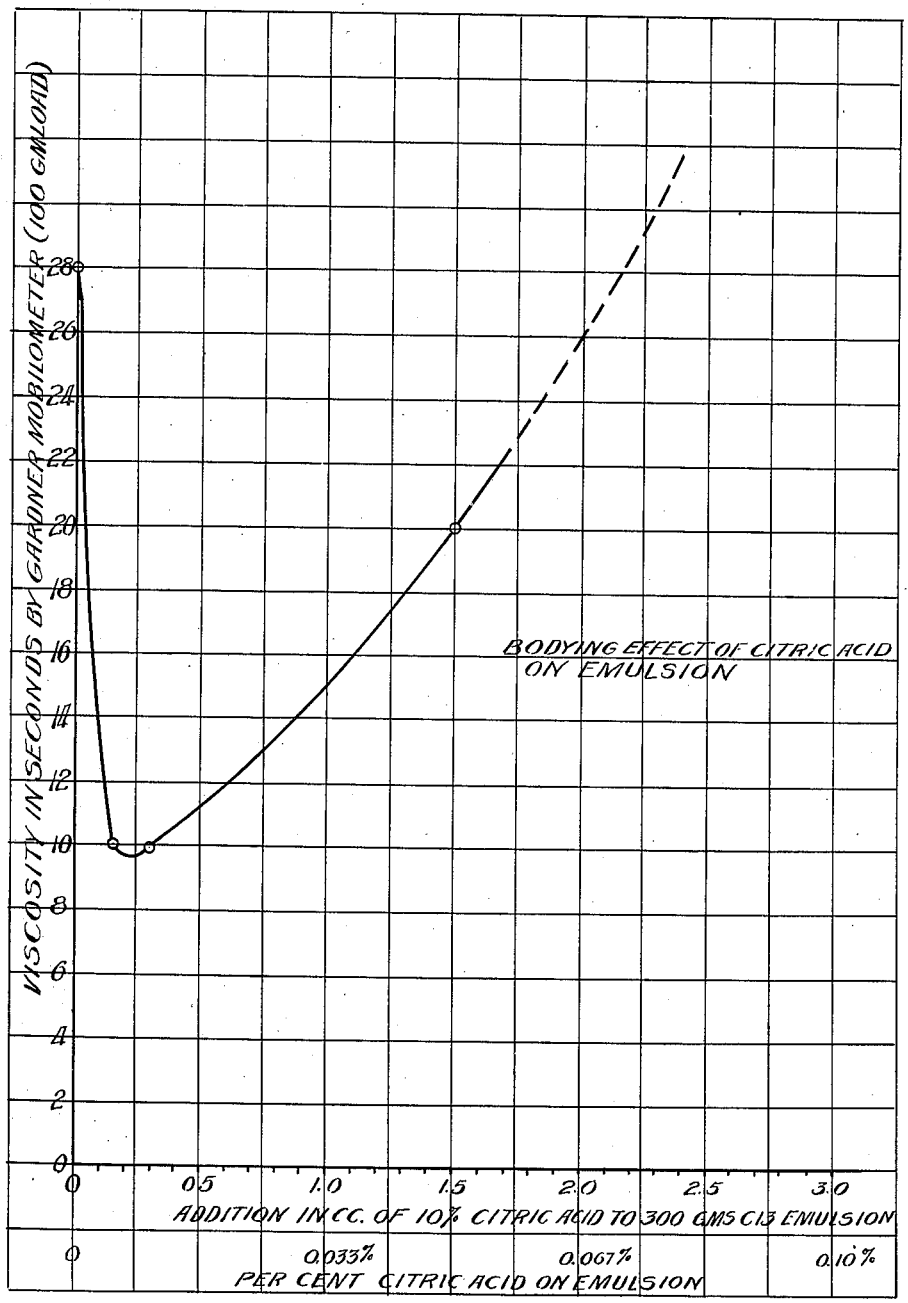

1,918,759

UNITED STATES PATENT OFFICE

LESTER KIRSCHBRAUN, OF LEONIA, NEW JERSEY, ASSIGNOR, BY MESNE ASSIGNMENTS, TO THE FLINTKOTE CORPORATION, OF BOSTON, MASSACHUSETTS, A CORPORATION OF MASSACHUSETTS

PROCESS OF TREATING EMULSIONS

Application filed August 24, 1929. Serial No. 388,061.

This invention relates to aqueous emulsions of substances normally immiscible with water and is concerned particularly with a mode of treatment of such emulsions whereby to improve certain of the properties thereof.

Aqueous emulsions of water-immiscible substances such as asphalt or the like, as commercially produced, find an extensive use as protective coatings for various types of surface by reason of the fact that the emulsified material when applied in layers of suitable thickness, provides, when the water is eliminated from the layer a substantially impermeable, waterproof protective film possessing substantially the same tenacity as does the material emulsified as well as other properties which are not possesssed by the emulsified material itself. Among the latter, one outstanding and highly desirable property of films of this character, particularly when derived from an emulsion made with certain types of emulsifying agents, is that the water free film is characterized by an ability to withstand flow under temperatures far in excess of the melting point of the material emulsified and hence, when films of this kind on vertical or inclined surfaces such as smokestacks, tanks, roofs or the like, are subjected to elevated temperatures even beyond the melting point of the material emulsified, the film remains in place despite the fact that the temperature may be sufficient to char or ignite the emulsified material.

Emulsions of bitumen in water, have also been used in connection with the manufacture of waterproof paper by applying the emulsion in the form of a film, as by means of a smooth roll between opposed surfaces of the paper plies substantially immediately as they are taken in the form of wet webs from the forming cylinder or other instrumentality.

In actual practice for commercial production and industrial application of asphalt or other bituminous emulsions, one of the prime considerations is to produce an emulsion of as low a water content as possible and thus with a correspondingly higher proportion of bitumen content, consistent of course with required stability of the emulsion, the desired average size of the dispersed particles, and other factors. A minimum proportion of the water phase of the emulsion is obviously desirable for numerous reasons, among them being that, where the emulsion is transported to the point of use, a proportionately small amount of water is entailed in the shipment of a given quantity of bitumen dispersed; secondly, more rapid coalescence and setting of a layer of the emulsion takes place when the water content thereof is relatively low, and this is particularly true of emulsions made with certain classes of emulsifying agents and which seem to undergo a delayed setting action at least to the extent that substantial setting and coalescence does not ordinarily occur until after nearly complete dehydration of the watery emulsion layer; thirdly, an emulsion of low water content seems to show less tendency of the dispersed particles to settle under the influence of gravity than does an emulsion of the same bitumen content and average particle size with a higher content of the aqueous phase; and there are other reasons, which will be apparent to those skilled in the art, why it is desirable to produce emulsions with minimum water content.

Aqueous bituminous emulsions with a water content of from 40 to 50% have been produced on an extensive commercial scale and applied to various industrial uses. It has been found, however, that emulsions carrying the smalled proportions of water, do not lend themselves to ready application with a brush or spray, in order to form smooth protective coatings for various surfaces. Where the material is applied with a brush, the film is generally streaked from the marks of the bristles, unless care is taken to smooth out the brush marks. It is quite possible to reduce this tendency somewhat, by thinning the emulsion with increased amounts of water to thereby render the emulsion more fluid, but in such case it becomes necessary to apply the material in a plurality of successive coats in order to build up a layer of sufficient thickness to afford the requisite protective properties. The film thickness usually deemed satisfactory for most purposes is about 0.05 inch.

In spray application also, the present commercial types of emulsion cannot be successfully applied unless the water content of the emulsion is at least 50%, and with less dilute emulsions, the film instead of being smooth and even when built up to any substantial thickness, exhibits superficial depressions or pockets which seem to be caused by the impinging force of the particles as they strike the surface in the form of a spray, and the inability of the emulsion to flow over into the pockets so as to level off the surface.

Observations indicate that the aforenamed tendencies and their resultant objections may be attributed to the fact that bituminous emulsions of this character, do not possess the bodied consistency or mobility characteristic of at least the better grades of ordinary paints and similar coatings. In the nomenclature of the art, the more desirable consistency of coatings of this character is generally referred to as one of a "long" body, and to those skilled in the art this type of body is readily distinguishable from a "short" bodied consistency. In most instances the difference can be recognized by picking up some of the material in a spoon or on a spatula, or the like, and noting how the material flows off the spoon or spatula. Materials of "short" body will generally flow off in successive gobs or droplets, whereas materials said to possess a "long" body generally flow off in a continuous non-broken stream of greater or less coherence and extensibility.

The primary object of my invention is to provide a treatment whereby aqueous emulsions of asphalt or the like, which have only a relatively "short" body may be thinned without addition of any water, improved as to their mobility, and converted into a "long" bodied consistency, so as to adapt emulsions of this kind for easy application with a brush, roll, spray, or the like, in layers of uniform thickness and smooth surface appearance. The treatment of emulsions according to my invention, is particularly suitable in connection with emulsions of low water content made with colloidal mineral powder emulsifying agents, such as clay, bentonite, metallic oxides, and the like, for I have found that the treatment provided by my invention, as will be described in greater detail hereinafter, affords a very simple method of increasing the mobility of this type of emulsion without substantially increasing the water content thereof, and at the same time imparts to the emulsion the highly desirable "long" body which is ordinarily absent in an emulsion in which the same fluidity or thinness has been attained chiefly by dilution with water.

I attain the foregoing objects of the invention by treating the emulsion preferably with certain chemical reagents of various constitution. I find that the best results are obtained with reagents of certain properties hereinafter to be more particularly pointed out, and having in their molecular structure at least one hydroxyl group, or at least one carboxyl group, or both hydroxyl and carboxyl groups, provided, however, that the carboxyl does not ionize readily to an extent sufficient to produce substantial flocculation. Numerous organic materials both of the open chain or aliphatic type, and of the closed ring or aromatic type and characterized as set forth, having been found suitable. Although it cannot be stated with certainty just why these reagents should function in this way, and while I do not intend the invention in its broadest aspects to be limited by the theories herein set forth, theoretical considerations lead me to believe that the adsorption of water by clay, bentonite, colloidal oxides and similar emulsifying agents, is due to the attraction between the coloidal particles of these emulsifying agents and the hydroxyl of the water. That further when reagents employed according to my invention are present in the emulsion, in the absence of flocculating concentrations of flocculating ions, the emulsifying agents selectively adsorb the reagents in preference to the water by virtue of the hydroxyl group (or groups) which these reagents possess in common with water, and consequently reduce the water adsorption of the emulsifying agent and thus enable water that would otherwise be adsorbed by the emulsifying agest to remain in the intermicellar space of the emulsion system. On the other hand, it may be that the reagents employed play the part of peptizers when employed in the quantities which I have found to be suitable for the purpose. Again, it may very well be that the peptizing effect may be explained as a phenomenon of selective adsorption of molecules of a reagent containing hydroxyl or carboxyl groups in preference to molecules of water, under the conditions stated.

In the drawing, the single figure is a graphic illustration showing results obtained with one typical reagent that may be employed according to my invention.

In carrying out the invention, the method of treatment may be used in conjunction with aqueous emulsions of bitumen, such as asphalts of melting point 100 to 200 degrees F., emulsified with an emulsifying agent such as one or a combination of the colloidal mineral powders heretofore mentioned. The resulting emulsion contains the finely dispersed asphalt in the internal phase and the water in the external phase. Generally, the asphalt will comprise about 58 to 63% of the emulsion, water will comprise about 35 to 40% thereof, there being also about 1 to 3% emulsifying agent therein. The emulsion of the foregoing composition will generally be of rather viscid consistency although this latter may vary somewhat, depending upon the size of the dispersed particles, type of emulsifying agent, etc. The mobility of the emulsion as thus ordinarily produced is quite low, that is to say, it has what is termed a "short" body. In order to improve the body or mobility of the emulsion, I combine therewith and uniformly incorporate therein, certain organic compounds which I have found effective for the purpose.

One of the reagents that I have found to be satisfactory is citric acid, when used in quantities of 0.005 to 0.01% by weight of the emulsion. The effect of citric acid is graphically illustrated in the figure wherein the curve shows the relationship between the mobility of the emulsion and varying amounts of citric acid. It will be noted from this curve that a maximum mobility with an emulsion containing bentonite as the emulsifying agent, is reached with about 0.007% citric acid, and that, with further additions of this reagent, the mobility decreases. This, I believe, can be attributed to the fact that citric acid dissociates to a considerable extent so that when the concentration thereof in the water phase is substantially in excess of 0.01% there is a sufficient concentration of hydrogen ions to cause flocculation and resultant thickening of the emulsion. While this curve pertains to an emulsion which has a certain degree of fluidity before treatment, the same general result prevails where thick, pasty, non-fluid emulsions are treated with proper quantities of the bodying agent without addition of water.

Tannic acid has also been found to function as a bodying agent for emulsions of the type indicated. The quantities of this acid generally required range from 0.25 to 1% of the chemically pure acid, or from 1.5 to 3.0% of the commercial form, on the basis of weight of emulsion treated.

Tartaric acid in amounts ranging from 0.15 to 0.30% and oxalic acid in amounts ranging from 0.02 to 0.06% relative to the weight of the emulsion, have also been found satisfactory to produce a desired bodying thereof, as has also gallic acid in quantities ranging from 0.02 to 0.5% on the weight of the emulsion. Similarly pyrogallic, maleic, pthalic, and pyromucic acids, as well as hydroquinone and resorcinol, have been tested and found to be satisfactory bodying agents when used in small quantities. The ability of these latter reagents to produce the desired bodying effect when employed in quantities such as indicated leads me to conclude that their suitability for the purpose of my invention may be attributed to the presence of hydroxyl and/or carboxyl groups in the molecular constitution. Hence these materials may be considered as illustrative of a great many organic reagents satisfying the conditions herein set forth. In the claims, the term "hydroxyl group" is intended to include carboxyl groups and hydroxyl groups or carboxyl groups alone.

I claim as my invention:

The process of treating relatively stiff emulsions of the bitumen-pitch type of paste-like consistency, and having a bentonite emulsifying agent to render the emulsion highly suspensible the step which comprises subjecting said suspensible emulsion to treatment with an agent having in its molecular structure at least one hydroxyl group or at least one carboxyl group or both hydroxyl and carboxyl groups and having the capability of both increasing its mobility, without the addition of a diluent, and of imparting to the emulsion a "long" bodied consistency.

LESTER KIRSCHBRAUN.